United States Patent [19]

Packer

[11] Patent Number: 5,070,748

[45] Date of Patent: Dec. 10, 1991

[54] DIAMOND FLUTED END MILL

[75] Inventor: Scott M. Packer, Pleasant Grove, Utah

[73] Assignee: Smith International, Inc., Houston, Tex.

[21] Appl. No.: 682,483

[22] Filed: Apr. 9, 1991

Related U.S. Application Data

[63] Continuation of Ser. No. 527,967, May 24, 1990, Pat. No. 5,031,484.

[51] Int. Cl.$^5$ .............................................. B21K 5/04
[52] U.S. Cl. ............................ 76/108.6; 76/DIG. 11; 76/DIG. 12; 407/118; 407/119
[58] Field of Search ............ 76/108.6, 108.1, DIG. 11, 76/DIG. 12; 408/144, 199; 407/30, 32, 53, 56, 61, 62, 63, 118, 119

[56] References Cited

U.S. PATENT DOCUMENTS

| 1,887,373 | 11/1932 | Emmons et al. | 408/144 |
| 1,887,374 | 11/1932 | Emmons et al. | 408/144 |
| 1,977,845 | 10/1934 | Emmons et al. | 408/144 |
| 4,527,643 | 7/1985 | Horton et al. | |
| 4,627,503 | 12/1986 | Horton | |
| 4,762,445 | 8/1988 | Bunting et al. | |

FOREIGN PATENT DOCUMENTS

| 3232686 | 3/1984 | Fed. Rep. of Germany | 408/144 |
| 2085769 | 5/1982 | United Kingdom | 408/144 |

Primary Examiner—Roscoe V. Parker
Attorney, Agent, or Firm—Robert G. Upton

[57] ABSTRACT

An end mill forms at least a pair of spiral grooves or flutes in the mill side walls. Each groove includes polycrystalline diamond formed along a leading edge of each flute. A process for forming the diamond edged on the PCD material bonded within the flute.

1 Claim, 2 Drawing Sheets

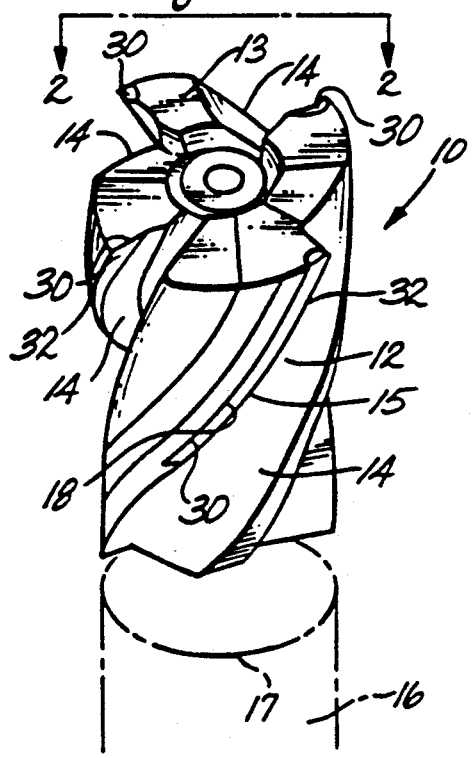
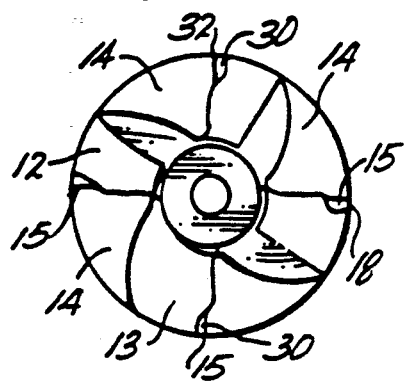
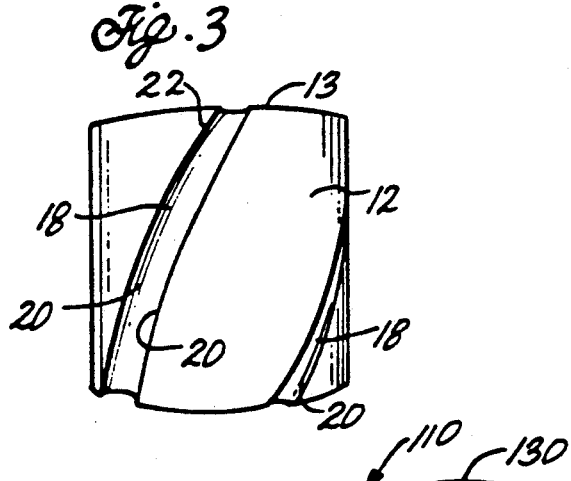
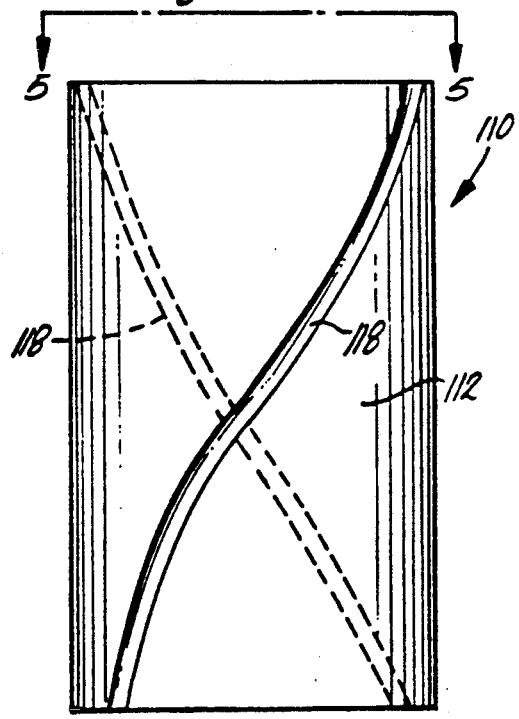
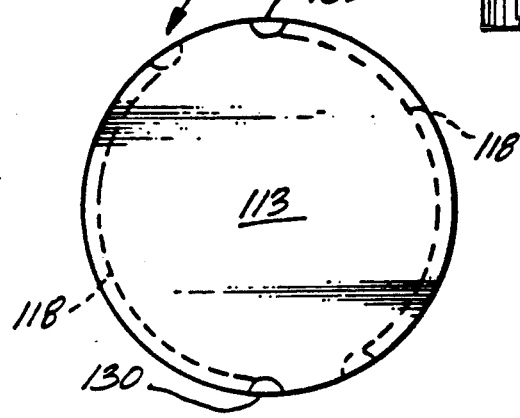

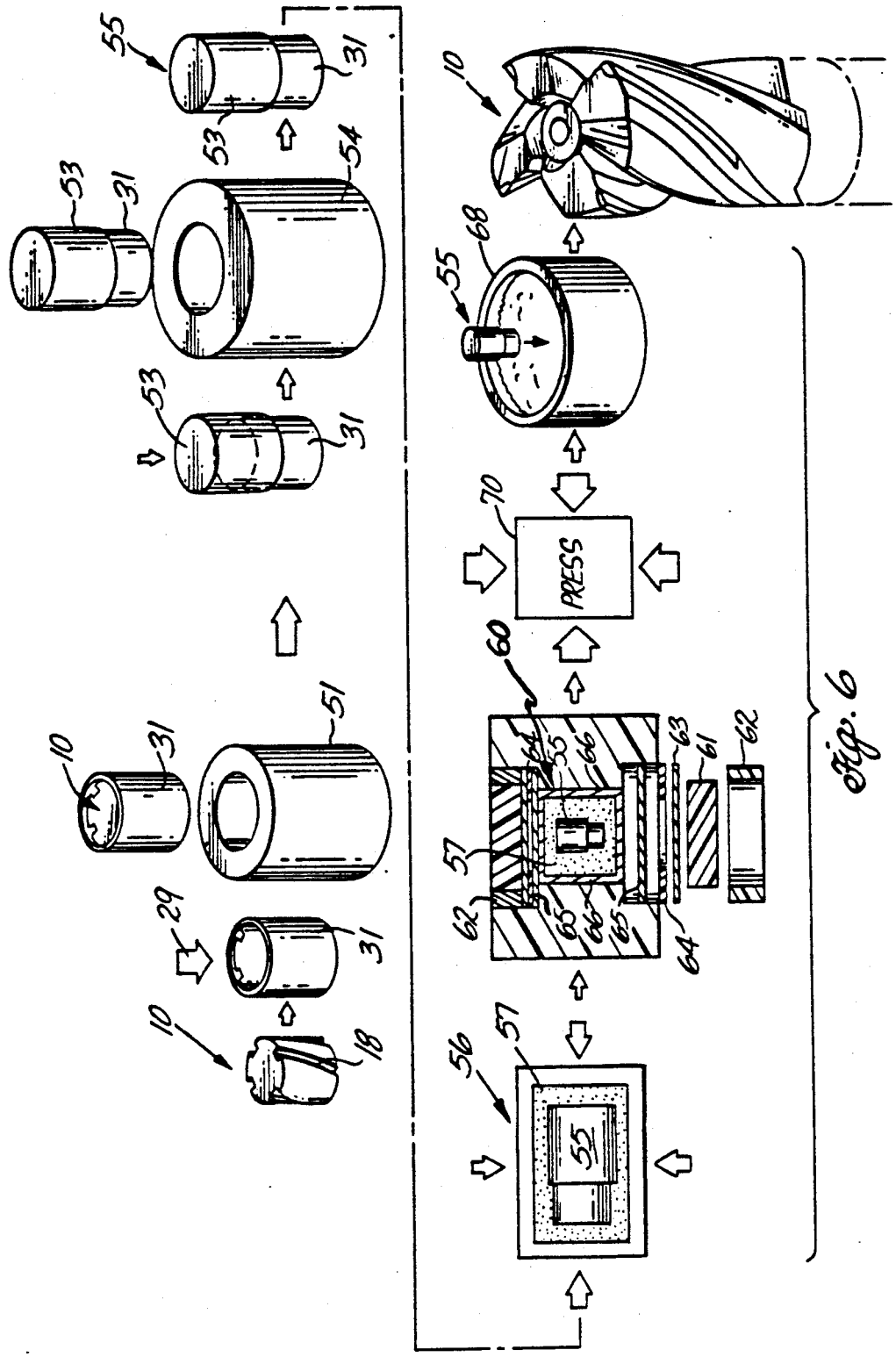

DIAMOND FLUTED END MILL

This is a continuation of application Ser. No. 07/527,967, filed May 24, 1990, now U.S. Pat. No. 5,031,484.

CROSS REFERENCE TO RELATED PATENT APPLICATIONS

This invention relates to a patent application entitled Diamond Twist Drill Blank, Ser. No. 393,162 filed Aug. 14, 1989, now U.S. Pat. No. 4,991,467.

BACKGROUND OF THE INVENTION

I. Field of the Invention

This invention relates to rotary cutting tools and more particularly to helically fluted end mills.

Helically fluted end mills are the most commonly used milling tools and are generally required to perform severe machining operations under extremely adverse conditions. The cutting end of a helically fluted end mill includes at least a pair of cutting lips on opposite surfaces of the end mill blank.

Oppositely directed cutting surfaces positioned at the cutting end of the mill blank are subjected to axial and torsional loads which create material demands on the fabrication of the milling tool. Obviously the material of the cutting lips should be as hard as possible to cut a work piece and it should be heat resistant as well to maintain the cutting edge of the mill at elevated temperatures. Moreover the material of the body of the mill blank must be both rigid and tough to resist deflection and to maintain the integrity of the mill under loads while the mill cutter is being used. The foregoing requirements have resulted in compromises in material selection since hard materials tend to be brittle while tough materials tend to wear quite easily.

This invention has application for other types of rotary cutting tools such as router bits, reamer and taps (not shown).

II. Description of the Prior Art

The prior art teaches a combination of materials having the characteristics of hardness and wear resistance at the cutting surfaces and toughness and rigidity of the body and shaft. It has been previously proposed to form the cutting surfaces of one material and the body and shaft of another. This has resulted in a variety of combinations such as tungsten carbide or diamond inserts or tips on carbon steel or carbide shafts. These combinations while individually useful have a common disadvantage, i.e. the braze connection between the insert or tip and a shaft. Tungsten carbide can be soldered or brazed directly to the steel or carbide shaft. However a diamond tip or insert must first be adhered to a carbide substrate which is in turn soldered or brazed to the shaft. Diamond particles are typically formed into a compact or PCD (polycrystalline diamond disc) and bonded to a carbide substrate with a metallic catalyst in a high pressure-high temperature press. At atmospheric pressures however the metal which catalyzes the bonding of the diamond particles to each other and to the substrate in the press will also catalyze the conversion of diamond to graphite at temperatures above 700 degrees centigrade which will cause disintegration of the PCD compact. Accordingly a low temperature solder or braze connection is used to attach the substrate to the shaft. The aforementioned diamond discs as well as the diamond insert stud blanks for example are fabricated from a tungsten carbide substrate with a diamond layer sintered to a face of a substrate the diamond layer being composed of polycrystalline material.

The synthetic polycrystalline diamond layer is manufactured by Megadiamond Industries, Inc., a wholly owned division of Smith International, Provo, Utah. Another source of polycrystalline diamond is manufactured by the specialty material department of General Electric Company of Worthington, Ohio. The foregoing drill cutter blank is known by the trademark name of Stratapax Drill Blank.

Two examples of patents assigned to Megadiamond describe cutting elements for drilling holes. U.S. Pat. No. 4,527,643 teaches a cutting element for drilling holes which consists of five cutting edges which are comprised of polycrystalline diamond or the like mounted to a central carbide substrate of similar hard material held by a rotatable shaft which can be inserted into a drilling machine. The polycrystalline material is then supported with respect to torsional forces exerted upon it during drilling.

U.S. Pat. No. 4,627,503 describes a polycrystalline diamond and metal element for use as a cutting element for drilling holes or similar uses. The cutting element comprises a polycrystalline diamond center portion sandwiched between metal. The metal side portion is made from a soft metal having a Young's Modulus less than approximately 45 times 10 to the sixth power and is selected from a group comprising cobalt, nickel, iron, copper, silver, gold, platinum, palladium and alloys of these metals in metallic compounds containing these metals.

Both of these recently issued patents utilize a braze type bonding element to secure the diamond cutters within a drill blank. Typically a low temperature solder or braze connection is used to attach the substrate to a shaft such as the shaft of a helical twist drill. This braze connection limits the effective life of such drilling tools since it is softer than either the substrate or the shaft. The braze thus becomes the weakest point of the tool construction and the limiting factor in the tool usage.

U.S. Pat. No. 4,762,445 teaches a helically fluted twist drill apparatus in which offset opposed veins of sintered abrasive particulate, such as diamond, are embedded within a drill blank made of a less abrasive material such as carbide. The non-aligned veins of abrasive material, themselves intersect through juxtapositioning adjacent the point and web of the drill. The veins of diamond are 180 degrees opposed across the tip of the helical drill blank. The opposing veins intersect at the center or axis of the helical drill to provide a concentration of diamond at the tip of the twist drill.

A disadvantage of the foregoing patent is that the veins of diamonds are relatively shallow at the tip of the twist drill and tend to wear out rather quickly.

The present invention overcomes the problems of the foregoing prior art by providing, for example, a concentration of diamond in each of a pair of flutes of a milling cutter blank.

SUMMARY OF THE INVENTION

An object of the present invention is to provide a helically fluted end mill with a diamond cutting surface.

More particularly, it is an object of the present invention to provide a helically fluted end mill with helical grooves in the flutes that are filled with compacted polycrystalline diamond.

It is another object of the present invention to provide a method of applying polycrystalline diamond powder in a groove formed along the helical flutes.

The invention consists of a helically fluted end mill with a first mill blank forming a first cutting end and a second base end. The mill blank further forms at least a pair of flutes. The mill blank is formed from a relatively tough material. Diamond powder material is compacted within the grooves and sintered in a press.

The mill blank is metallurgically bonded at the base end to a mill shank thereby completing the fluted end mill cutter.

An advantage then of the present invention over the prior art is the application of diamond within the helix of the flutes of an end mill.

The above noted objects and advantages of the present invention will be more fully understood upon a study of the following description in conjunction with the detailed drawings.

BRIEF DESCRIPTION OF THE DRAWINGS

FIG. 1 is a perspective view of a fluted end mill;

FIG. 2 is an end view taken through 2—2 of FIG. 1;

FIG. 3 is a perspective view of an end mill blank with four helical flutes machined therein;

FIG. 4 is a side view of an end mill blank with a pair of helical flutes 180° one from the other;

FIG. 5 is an end view taken through 5—5 of FIG. 4; and

FIG. 6 is a semi-schematic diagram of the process steps involved to fabricate the end mill cutter.

DESCRIPTION OF THE PREFERRED EMBODIMENTS AND BEST MODE FOR CARRYING OUT THE INVENTION

The diamond end mill of FIG. 1 generally designated as 10 consists of an end mill blank body 12 having, for example, four flutes 14 circumferentially and equidistantly spaced around the body 12. The body 12 of the end mill may, for example, be fabricated from a hard and tough material such as tungsten carbide. A groove 18 is formed in the leading edge 15 of the flutes 14. A sintered polycrystalline diamond 30 is pressed in the helically formed groove 18. Cutting lips 32 are ground into the sintered diamond material 30 pressed in the grooves 18 formed by the flutes 14 of the drill blank 12. The tungsten carbide drill blank may then be metallurgically bonded to a steel or carbide drill shank 16 along juncture 17. The metallurgical bond may, for example, be a braze.

Turning now to FIG. 2 the end 13 of the mill 10 further illustrates the grooves 18 forming the leading edge 15 of the flutes 14. The polycrystalline diamond (PCD) 30 being compacted and sintered within the grooves 18. The flutes 14 and the cutting edge or lip 32 is ground into the PCD material after the sintering process is complete (the schematically depicted process of FIG. 6).

Turning now to FIG. 3 the tungsten carbide drill blank body 12 is formed with, for example, four helically configured grooves 18 therein. The flutes 14 subsequently formed in the mill body after the diamond is sintered within groove 18. The helically formed grooves 18 are equidistantly spaced around the outer circumferential walls of the blank 12 and provide a receptacle for the PCD powder compacted therein. The sides 20 of the helical groove 18 preferrably trausision into a rounded bottom 22 of the groove 18. Identical sides 20 are formed in the other grooves 18. The reason for the rounded bottom 22 of the groove 18 is to assure that the polycrystalline diamond powder material is packed into the groove without any possibility of voids. If the sides of the groove were 90 degrees to the bottom 22 of the groove then the sharp 90 degree corners could cause stress risers and voids in the diamond material.

With reference now to FIG. 4, an alternate end mill blank 110 is illustrated with a pair of grooves 118 formed in the blank body 112.

It would be obvious to provide diamond end mills with one or more grooves that substantially parallel an axis of the mill blank body (not shown).

It would additionally be obvious to provide cutters across the ends 13 and 113 of the blank bodies 12 and 112 to enhance plunging and milling operations without departing from the scope of this invention (not shown).

Referring now to FIGS. 1, 2 and 5, the grooves 18 and 118 are compacted with diamond powder 30 and 130 and sintered in a press. The polycrystalline diamond material 30 then is formed in the helical grooves 18 of the tungsten carbide blank body 12. A solid mass of diamond in grooves 18 and 118 is thus formed in the blank side walls of the end mill bodies 12 and 112. The end mill blank is then machined to form the flutes 14. A subsequent grinding process forms the cutting gage surface or lips 32 on the sides of the blank bodies 12 and 112.

What follows is a process of forming, for example, a ⅜ end mill cutter. Referring now to FIG. 6, a carbide blank having, for example, four flutes formed in the blank is formed slightly oversize (by 30 or 40 thousands) on the diameter of the end mill blank. The end mill is machined to the proper diameter after the diamond sintering process is completed. As indicated before, the end mill blank body 12 is preferably formed from a tungsten carbide material. The helically formed groove 18 is formed in each of the flutes 14 with a depth of about 50 thousands and a width of the groove 18 of about 0.060 thousands of an inch, the sidewalls 20 transition into rounded bottom 22 of the helical groove 18 to a wider opening at the surface of the flutes 14. As indicated before the groove 18 is so configured to assure that the polycrystalline diamond powder is packed in the groove without voids. The diamond material is preferably polycrystalline diamond powder having a size range from 3 to 60 microns. The preferred size range of the powder is from 4 to 16 microns. The binder for the diamond powder is cobalt. A ratio of cobalt to diamond is 6 to 15 percent cobalt. The percentage of cobalt is preferred to be 13 percent. A gap filling material of smaller sized diamond powder may be used. The gap filling diamond powder is preferred to be from 1 to 3 microns in size.

The flutes of the tungsten carbide blank or body 12 are preferably prepared by breaking the corners of the flutes (not shown). The reason for "dulling" the corners of the flutes will become apparent with further discussion of the process. The blank 12 is then placed in a "getter" can or recepticle 31. The mixed diamond powder and cobalt is then packed into the grooves 18. The "getter" is a reactive metal that reacts with contaminates and oxides to facilitate better diamond bonding. The diamond getters go after the impurities in the mix to facilitate or achieve a better bond. A typical getter material is selected from the group consisting of zirconium, columbium, tantalum and hafnium. For example, the recepticle 31 is formed of the columbian getter material and laid over the diamond powder pressed in the grooves 18 formed in both of the flutes 14. The end mill body 12 in the can is then run through a die to make the blank more compact. The second can 53 of columbium then is run through a die to completely seal the second can 53 over the first can 31. The sealed can containing the blank 12 and now generally designated as 55 is then run through a pre-compact stage 56. The can 55 is first surrounded by salt 57 then is put in a pre-compact press 56 to further compact the can 55. The can is subjected to around 100 thousands ksi (100 thousand pounds per square inch) in the pre-compact press. The range of force on the can, may be for example, 50 to 100 thousand pounds per square inch. This assures that the blank 12 trapped within the columbium cans 50 and 53 is as dense as possible prior to the sintering process. The compressed can 55 is now ready for the sintering process. The reason the flute edge's are dulled is to prevent the columbium cans from being cut during the pre-compaction stage.

The can 55 is loaded into a pyrophyllite cube. The cube generally designated as 60 is packed with salt rings 57 and lined with a graphite material 66. The cube 60 is then capped with a titanium ring 65 followed by a mica ring baffle 64 and another titanium ring 63. A relatively thick steel ring 62 surrounds a pyrophyllite cap material 61. Both ends of the pyrophyllite cube have the same assembly thus closing in the can 55 within the salt rings 57 in the center of the pyrophyllite cube 60. The assembled cube 60 then goes to the press 70. The cube 60 is then pressed at a temperature of about 1,300 to 1,600 degrees centigrade at a pressure of about 1 million pounds per square inch. The time of the press is approximately 10 minutes. In a specific example, the temperature is ramped up to 1,500 degrees centigrade for about 4 minutes, the cube 60 is held at temperature of 1,500 degrees centigrade for about 1 minute and then allowed to cool down for approximately 5 minutes. An important aspect of this process is that the heat up be relatively slow with a slow cool down period. This is done primarily to reduce residual stresses within the finished end mill 10.

The sintered can 55 is subsequently broken out of the phyrophyllite cube 60. The sintered end mill blank body 12 is still housed within the cans 31 and 53 of columbium material. The enclosed end mill blank 12 is then dropped into a bath of fused potassium hydroxide. The potassium hydroxide serves to remove the columbium can material from the blank 12.

The blank body 12, after the sintering process, is then brazed to a mill shank 16. The blank 12 with attached shank 16 is then ground to the finished diameter prior to grinding the flutes 14, sintered diamond 30 and relief angles as required.

The pre-sintered polycrystalline diamond may be fabricated using a patented process, U.S. Pat. No. 4,797,241 assigned to Megadiamond, a wholly owned division of Smith International and incorporated herein by reference.

Cubic Boron Nitride (CBN) can be used in the fabrication of these mill cutters or the like in the place of PCD without departing from the scope of this invention.

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

What is claimed is:

1. A process for forming a rotary cutter characterized by the steps of:
   forming a rotary cutter blank of cemented tungsten carbide;
   forming at least a pair of longitudinally extending grooves in an outside surface of the blank;
   filling the grooves with diamond-like material;
   bonding the diamond-like material in the grooves in the rotary cutter blank at a sufficient pressure to form polycrystalline diamond-like material;
   forming longitudinally extending flutes in the rotary cutter blank along a leading edge of the polycrystalline diamond-like material after forming the polycrystalline diamond-like material in situ; and
   forming a cutting edge along a leading edge of the polycrystalline diamond-like material.

* * * * *